US009163559B2

(12) United States Patent
Nicholson et al.

(10) Patent No.: US 9,163,559 B2

(45) Date of Patent: Oct. 20, 2015

(54) INTERNAL COMBUSTION ENGINE AND A METHOD OF OPERATION OF AN INTERNAL COMBUSTION ENGINE

(75) Inventors: Mathew Paul Nicholson, Peterborough (GB); Christopher Thorne, Huntworth (GB)

(73) Assignee: Perkins Engines Company Limited, Peterborough (GB)

( * ) Notice: Subject to any disclaimer, the term of this patent is extended or adjusted under 35 U.S.C. 154(b) by 152 days.

(21) Appl. No.: 13/989,739

(22) PCT Filed: Dec. 6, 2011

(86) PCT No.: PCT/EP2011/071959

§ 371 (c)(1), (2), (4) Date: May 24, 2013

(87) PCT Pub. No.: WO2012/080043

PCT Pub. Date: Jun. 21, 2012

(65) Prior Publication Data

US 2013/0247564 A1 Sep. 26, 2013

(30) Foreign Application Priority Data

Dec. 17, 2010 (EP) .................................... 10195627

(51) Int. Cl.

| | |
|---|---|
| ***F02D 23/00*** | (2006.01) |
| ***F02B 47/08*** | (2006.01) |
| ***F02D 13/02*** | (2006.01) |

(Continued)

(52) U.S. Cl.

CPC ............ *F02B 47/08* (2013.01); *F02D 13/0234* (2013.01); *F02D 13/0269* (2013.01); *F02D 23/00* (2013.01); *F02D 41/005* (2013.01); *F02D 41/0077* (2013.01); *F02M 25/0713* (2013.01); *F02D 41/0002* (2013.01); *F02D 41/0007* (2013.01); *F02M 25/0707* (2013.01); *F02M 25/0727* (2013.01); *Y02T 10/142* (2013.01); *Y02T 10/144* (2013.01); *Y02T 10/47* (2013.01)

(58) Field of Classification Search

None

See application file for complete search history.

(56) References Cited

U.S. PATENT DOCUMENTS

| | | | | |
|---|---|---|---|---|
| 5,161,497 | A | 11/1992 | Simko et al. | |
| 5,427,078 | A * | 6/1995 | Hitomi et al. | ............. 123/559.1 |

(Continued)

FOREIGN PATENT DOCUMENTS

| | | |
|---|---|---|
| JP | 4-36026 | 2/1992 |
| JP | 6-330776 | 11/1994 |

(Continued)

OTHER PUBLICATIONS

JP06330776_Translation to Sasaki et al Nov. 1994.*

(Continued)

*Primary Examiner* — Jesse Bogue

(57) ABSTRACT

An internal combustion engine and a method of operation are described involving: supplying intake gas from an intake manifold (18) to an air intake port of a combustion chamber in a cylinder (11); selectively operating an air intake valve using a first operating profile (30) and, on demand, switching selective operation of the air intake valve to a second operating profile (31) in which the closing of the air intake valve is delayed compared to the closing of the air intake valve using the first operating profile; wherein at the point (43) of or prior to switching from the first operating profile to the second operating profile the pressure of the intake gas in the intake manifold is increased.

13 Claims, 4 Drawing Sheets

10 11 14 C T 16 17 18 13 15 12 19 20

(51) Int. Cl.
*F02D 41/00* (2006.01)
*F02M 25/07* (2006.01)

(56) References Cited

U.S. PATENT DOCUMENTS 5,642,703 A * 7/1997 Stockhausen et al. ..... 123/198 F
5,682,854 A 11/1997 Ozawa
5,778,674 A 7/1998 Kimura
6,276,334 B1 8/2001 Flynn et al.
6,321,731 B1 11/2001 Russ et al.
6,651,618 B1 11/2003 Coleman et al.
6,964,270 B2 11/2005 Janssen et al.
7,184,877 B1 * 2/2007 de Ojeda ........................ 701/104
7,275,516 B1 * 10/2007 Cunningham et al. ........ 123/305
2002/0078924 A1 * 6/2002 Yagi ............................. 123/399
2003/0066510 A1 * 4/2003 Kuboshima et al. .......... 123/305
2004/0006986 A1 1/2004 Baeuerle
2007/0251217 A1 * 11/2007 Majima ........................... 60/285
2007/0261406 A1 11/2007 Boyapati
2008/0216780 A1 * 9/2008 Nakamura ................ 123/90.15
2009/0173319 A1 7/2009 Koch

FOREIGN PATENT DOCUMENTS

JP 06330776 A * 11/1994 .............. F02D 23/00
JP 7-102982 4/1995
JP 11-223137 8/1999

OTHER PUBLICATIONS

English-language International Search Report from European Patent Office for International Application No. PCT/EP2011/071959, mailed Mar. 2, 2012.
English-language European Search Report from Munich Patent Office for EP 10 19 5627, date of completion of search May 6, 2011.

* cited by examiner

INTERNAL COMBUSTION ENGINE AND A METHOD OF OPERATION OF AN INTERNAL COMBUSTION ENGINE

FIELD

The present disclosure relates to an internal combustion engine and a method of operating an internal combustion engine.

BACKGROUND

Internal combustion engines comprise inlet and exhaust valves to control the flow of gases into and out of the combustion chamber of each engine cylinder. Ordinarily the valves are mechanically controlled by means of a camshaft. Profiled cams on the camshaft are used to control timing of opening and closing of each valve.

Since the physical shape and profile of the cams may only be optimised for one particular operating condition of the internal combustion engine, it is known to use a variable valve actuation system where the operation of the valves may by adjusted to suit changing demand. For example, a standard profile may be utilised during periods of medium or high engine demand and a late inlet valve closing (LIVC) profile may be utilised for the inlet valve during steady state conditions when the demand on the internal combustion engine is relatively low. In a LIVC profile the closing of the intake valve at about the end of the intake stroke is delayed, so that the intake valve remains open for a portion of the compression stroke. This results in a lower pressure within the cylinder. Consequently, the cylinder piston does less work during the compression stroke which leads to improved fuel efficiency.

A problem with use of an LIVC profile is that when instantaneously switching from the standard profile to the LIVC profile there is a sudden drop in the air-to-fuel ratio within the cylinder. This leads to a rich mixture which tends to produce unwanted soot particulates and smoke. In order to attempt to overcome this problem it is known to employ a control system that gradually switches from the standard profile to the LIVC profile over relatively large number of engine cycles—typically around 20 cycles. However such control systems are complicated and expensive.

DISCLOSURE

According to the present disclosure there is provided a method of operating an internal combustion engine comprising at least one cylinder, the method comprising:

supplying intake gas from an intake manifold to an intake port of a combustion chamber in the cylinder;

selectively operating an intake valve using a first operating profile to open and close the intake port to control flow of the intake gas between the intake manifold and the combustion chamber;

on demand, switching selective operation of the intake valve to a second operating profile in which the closing of the intake valve is delayed compared to the closing of the intake valve using the first operating profile;

wherein at the point, or prior to the point of switching from the first operating profile to the second operating profile the pressure of the intake gas in the intake manifold is increased.

There is also provided an internal combustion engine comprising:

at least one cylinder;

an intake manifold for receiving intake gas;

an intake port communicating between the intake manifold and a combustion chamber of the cylinder;

an intake valve movable to open and close the intake port to control flow of the intake gas between the intake manifold and the combustion chamber;

a turbocharger or supercharger for pressurising at least a portion of the intake gas supplied to the intake manifold; and a controller configured selectively to control operation of the intake valve between a first operating profile and a second operating profile in which the closing of the intake valve is delayed compared to the closing of the intake valve using the first operating profile;

the controller being further configured to increase the pressure of the intake gas in the inlet manifold at the point, or prior to the point of switching from the first operating profile to the second operating profile by directly of indirectly controlling operation of the turbocharger or supercharger.

DETAILED DESCRIPTION

Figure 1:
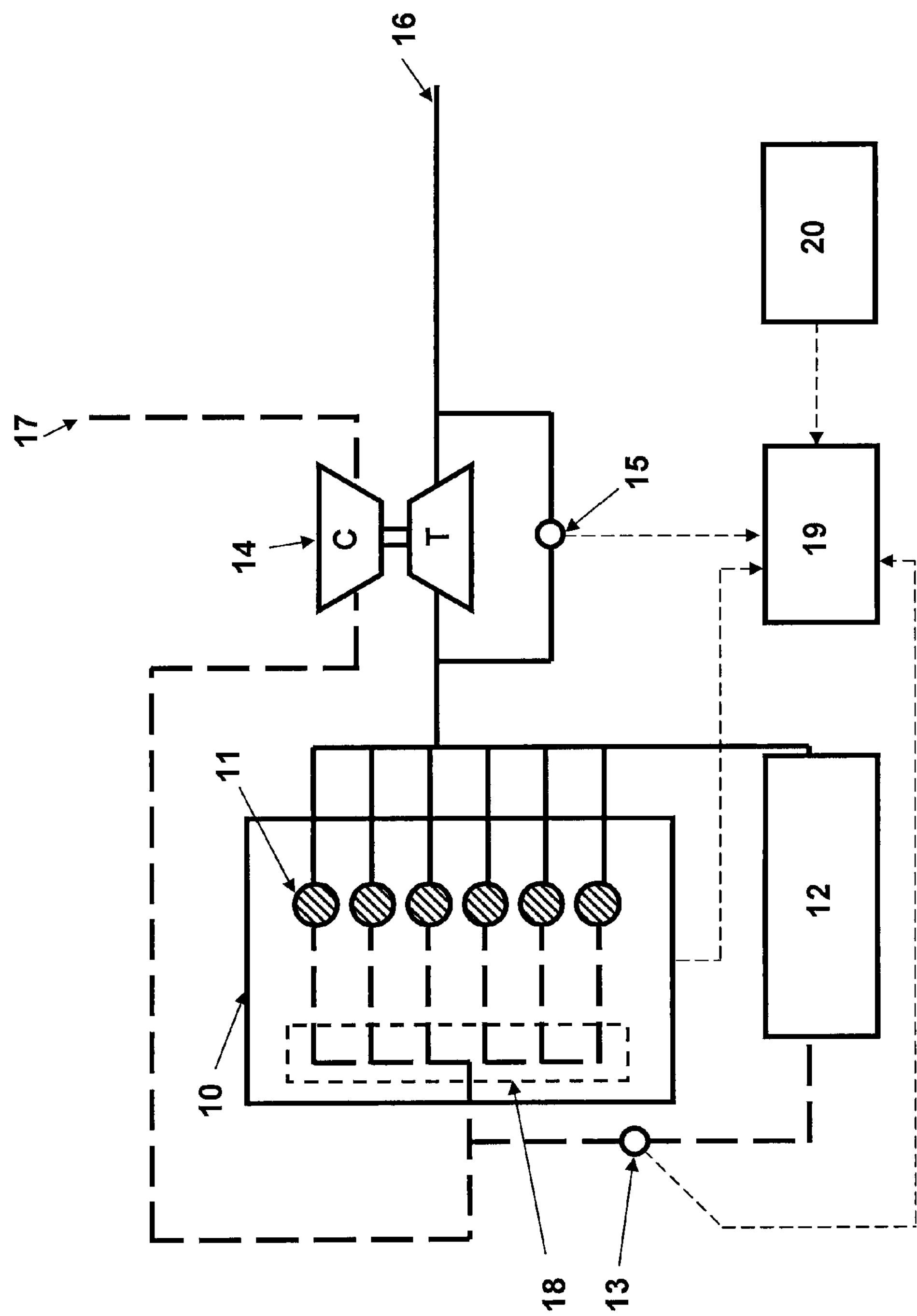
FIG. 1 is a schematic diagram of an internal combustion engine according to the present disclosure.

The internal combustion engine of the present disclosure, as shown in FIG. 1, may comprise one or more cylinders 11 in an engine block 10. For example, the engine may contain four or six cylinders 11. An intake manifold 18 may supply intake gas to each cylinder 11. The intake gas may be a mixture of air and exhaust gases that are recirculated by an exhaust gas recirculation (EGR) system 12. The EGR system 12 may comprise a cooler for cooling the recirculated exhaust gases. An EGR valve 13 may be provided operatively to control the amount of exhaust gas recirculated to the intake manifold 18.

Non-recirculated exhaust gases may be conveyed to an exhaust line 16 via a turbine section of a turbocharger 14. The exhaust gases may cause the turbine section to rotate thus rotating the compressor section of the turbocharger 14. The compressor section may be configured to pressurise a flow of air supplied to the intake manifold 18 from an air inlet 17. Ambient air may enter air inlet 17.

A wastegate 15 may be provided to allow exhaust gases to bypass the turbocharger 14.

Each cylinder 11 may contain a piston slidably movable in the cylinder 11. A crankshaft may be rotatably disposed within the engine. A connecting rod may couple the piston to the crankshaft so that sliding motion of the piston within the cylinder 11 results in rotation of the crankshaft. Similarly, rotation of the crankshaft results in a sliding motion of the piston. For example, an uppermost position of the piston in the cylinder 11 corresponds to a top dead centre position of the crankshaft, and a lowermost position of the piston in the cylinder 11 corresponds to a bottom dead centre position of the crankshaft.

As one skilled in the art will recognize, the piston in a conventional, four-stroke engine cycle reciprocates between the uppermost position and the lowermost position during a combustion (or expansion) stroke, an exhaust stroke, an intake stroke, and a compression stroke. Meanwhile, the crankshaft rotates from the top dead centre position to the bottom dead centre position during the combustion stroke, from the bottom dead centre to the top dead centre during the exhaust stroke, from top dead centre to bottom dead centre during the intake stroke, and from bottom dead centre to top dead centre during the compression stroke. Then, the four-stroke cycle begins again. Each piston stroke correlates to about 180° of crankshaft rotation, or crank angle. Thus, the combustion stroke may begin at about 0° crank angle, the exhaust stroke at about 180°, the intake stroke at about 360°, and the compression stroke at about 540°.

The cylinder 11 may include at least one intake port and at least one exhaust port, each opening to a combustion chamber within the cylinder 11. The intake port may be opened and closed by an intake valve, and the exhaust port may be opened and closed by an exhaust valve. The intake valve may be movable between a first, open position in which flow of gas from an intake manifold 18 is permitted to enter the combustion chamber and a second, closed position which substantially blocks flow from the intake manifold 18 into the combustion chamber. The intake valve may be sprung-biased to the second, closed position.

A camshaft carrying a cam with one or more lobes may be arranged to operate the intake valve cyclically based on the configuration of the cam, the lobes, and the rotation of the camshaft to achieve a desired intake valve timing. The exhaust valve may be configured in a manner similar to the intake valve and may be operated by one of the lobes of the cam. Alternatively, the intake valve and/or the exhaust valve may be operated hydraulically, pneumatically, electronically, or by any combination of mechanics, hydraulics, pneumatics, and/or electronics.

Figure 2:
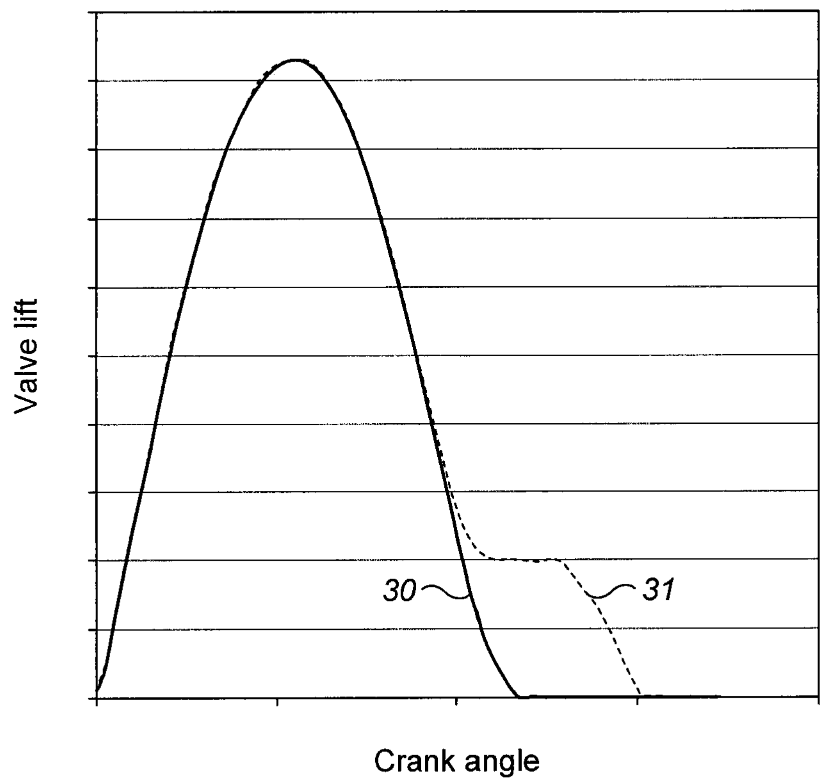
FIG. 2 is a diagram of intake valve lift versus crank angle.

In a first, standard, operating profile of the intake valve, the cam profile may cause the intake valve to open at about the start of the intake stroke (about 360° crank angle) and to close at about the start of the compression stroke or shortly thereafter (about 540° crank angle or shortly thereafter). This first operating profile is shown by the solid line 30 in FIG. 2. The first operating profile may be most suitable for medium to heavy engine loading conditions.

The intake valve may include a variable valve actuation system comprising an intake valve closing mechanism structured and arranged selectively to interrupt cyclical movement of and extend the closing timing of the intake valve to provide a second operating profile for the intake valve. For example, closure of the intake valve may be delayed by about 60° crank angle compared to the first operating profile. This second operating profile is shown by the dashed line 31 in FIG. 2 and represents a LIVC profile. The second operating profile may be most suitable for steady-state and/or low engine loading conditions.

The intake valve closing mechanism may be operated hydraulically, pneumatically, electronically, mechanically, or any combination thereof. For example, the intake valve closing mechanism may be selectively operated to supply hydraulic fluid, for example, at a low pressure or a high pressure, in a manner to resist closing of the intake valve by spring-bias. That is, after the intake valve is lifted, i.e., opened, by the cam, and when the cam is no longer holding the intake valve open, the hydraulic fluid may hold the intake valve open for a desired period. The desired period may change depending on the desired performance of the engine.

A controller 19 may be provided for controlling operation of the internal combustion engine. The controller 19 may be operatively connected to the EGR valve 13, the wastegate 15 and the intake valve closing mechanism of each cylinder 11.

The controller 19 may also be operatively connected to one or more sensors 20 which may provide the controller 19 with indications of one or more engine conditions or other data from which the loading of the internal combustion engine can be determined. The sensors 20 may include sensors detecting engine speed, engine torque, or detecting the work state of a vehicle in which the internal combustion engine is incorporated. For example, sensors detecting heavy digging, hill climbing or fast digging may be utilised.

The operation of the intake valve may be switched from the first operating profile 30 to the second operating profile 31 instantaneously. By 'instantaneously' is meant that the switching of operation from the first operating profile to the second operating profile is not phased gradually over many engine cycles. Rather, switching may take place between one engine cycle and the next engine cycle, for example within one revolution of a cam shaft of the internal combustion engine.

In order to reduce or avoid a drop in the air-to-fuel ratio within the cylinder 11 when switching from the first operating profile to the second operating profiles, the pressure of the intake gas in the intake manifold 18 may be increased at the point, or preferably, prior to switching. This may be achieved by temporarily closing the wastegate 15 to avoid exhaust gases bypassing the turbocharger 14. This results in an increased mass flow of gas through the turbocharger 14 resulting in an increased boost level of the pressurisation of the inlet air fed to the inlet manifold 18.

Movement of the wastegate may be relatively slow. Therefore, in addition or instead of closing the wastegate 15, the EGR valve 13 may be partially or fully closed prior to switching from the first operating profile 30 to the second operating profile 31 more quickly to increase the quantity of exhaust gas fed to the turbocharger 14. Movement of the EGR valve 13 may be relatively fast compared to movement of the wastegate 15. Closing the EGR valve 13 may also have the effect of increasing the proportion of fresh air entering the cylinders 11.

Figure 4:
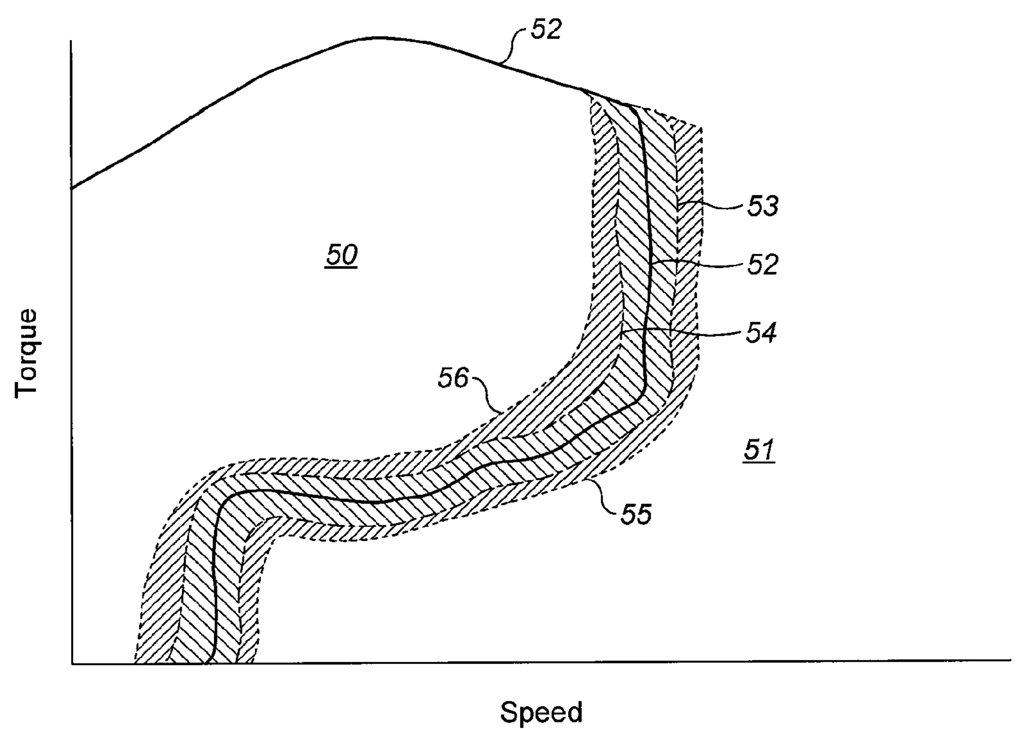
FIG. 4 is a schematic engine map plotting engine torque versus engine speed.

FIG. 4 is a schematic engine map plotting engine torque versus engine speed of the type which may be suitably incorporated into the programming of the controller 19 to control switching between the first operating profile 30 and the second operating profile 31. Region 50 signifies a steady state operating zone where the first operating profile 30 for the intake valve is used. Region 51 signifies a steady state operating zone where the second operating profile 31 for the intake valve is used so as to delay closing of the intake valve. The regions between boundaries 55 and 56 represent a transitional zone, the effect of which will be described below.

A non-limiting example of switching from the first operating profile 30 to the second operating profile 31 will now be described. The engine condition may start in region 50. Under changing engine conditions boundary 56 may first be encountered. At this point the wastegate 15 and/or EGR valve 13 may be closed. As the engine conditions cross a switching boundary 52 the intake valve profile may be instantaneously switched to the second operating profile 31. As the engine conditions cross a debounce boundary 53 the EGR valve 13 may be returned to its prior, open position. However, the wastegate 15 may remain closed. The region between switching boundary 52 and debounce boundary 53 may be used for hysteresis control of the switching process.

A non-limiting example of switching from the second operating profile 31 to the first operating profile 30 will now be described where the engine may be under high speed, high load conditions such that the engine components may be operating near their design limits. The engine condition may start in region 51. Under changing engine conditions, for example during a transient loading event, boundary 55 may first be encountered. At this point the wastegate 15 may start to be opened. As the engine conditions cross the switching boundary 52 the intake valve profile may be instantaneously switched to the first operating profile 30 while at the same time the EGR valve 13 may be briefly opened (if not already open) or further opened which may help to reduce any temporary increase in the speed of the turbocharger 14 and temporary increase in the pressure in the intake manifold 18 which might be detrimental to engine components operating near their design limits. As the engine conditions cross a debounce boundary 54 the wastegate 15 may be opened and control of the EGR valve 13 may return to the steady state control regime for region 50. The region between switching boundary 52 and debounce boundary 54 may be used for hysteresis control of the switching process.

The beneficial effect of boosting the pressure in the intake manifold 18 prior to switching from the first operating profile 30 to the second operating profile 31 may be seen in FIG. 3. In FIG. 3 the point in time of switching from the first operating profile 30 to the second operating profile 31 is depicted by line 43. In each of FIGS. 3*a* to 3*f*, line 40 indicates the effect of instantaneous switching from the first to the second operating profile without changing the position of the wastegate 15 or EGR valve 13. Line 41 indicates the effect of closing the EGR valve 13 and wastegate 15 at the point of switching 43. Line 42 indicates the effect of closing the EGR valve 13 and wastegate 15 prior to the point of switching 43.

Figure 3A:
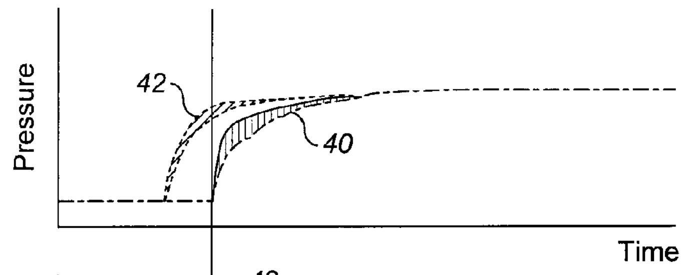
FIG. 3*a* is a diagram of inlet manifold air pressure versus time.
Figure 3B:
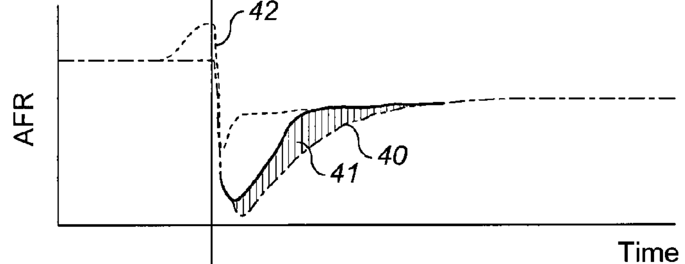
FIG. 3*b* is a diagram of air-to-fuel ratio versus time.
Figure 3C:
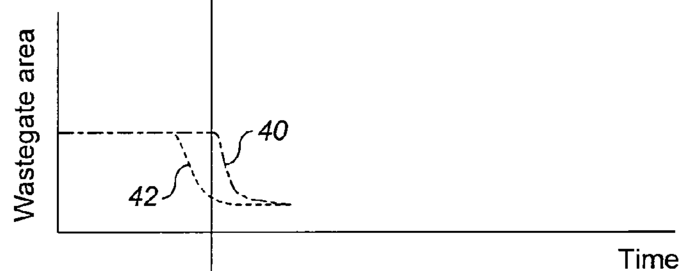
FIG. 3*c* is a diagram of wastegate area versus time.

FIG. 3*c* shows the wastegate area and illustrates that the wastegate area may be reduced prior to switching for line 42.

Figure 3D:
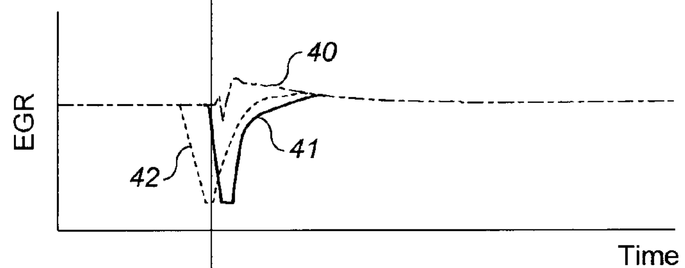
FIG. 3*d* is a diagram of exhaust gas recirculation (EGR) equivalence ratio versus time.
Figure 3E:
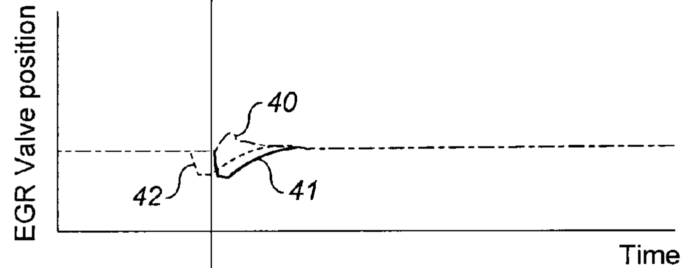
FIG. 3*e* is a diagram of EGR valve position versus time.

FIG. 3*e* shows the position of the EGR valve 13 and illustrates that the valve may be closed or partially closed prior to the point of switching 43 before being reopened following switching.

FIG. 3*d* shows the effect of the EGR valve position on the EGR equivalence ratio and illustrates that the ratio decreases before the point of switching 43 before recovering as the EGR valve 13 is reopened.

FIG. 3*a* shows the effect of altering the operation of the wastegate 15 and EGR valve 13 as described above. In particular the graph illustrates that the pressure in the intake manifold 18 increases prior to the point of switching 43 for line 42.

Figure 3F:
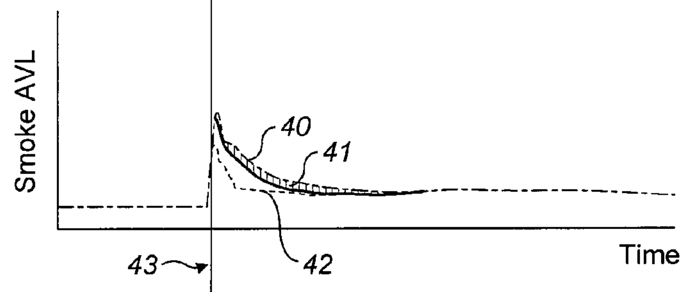
FIG. 3*f* is a diagram of smoke level versus time.

FIGS. 3*b* and 3*f* show the effect of the increased intake manifold pressure on the air-to-fuel ratio (AFR) and smoke levels respectively. It can be seen that the AFR may undergo a much-reduced dip after the point of switching 43 for line 42 where the intake manifold pressure is increased prior to switching. As shown in FIG. 3*f* this may have the effect of significantly reducing smoke and soot levels—which may be determined using an AVL meter, for example.

It can therefore be seen that whilst closing the EGR valve 13 and wastegate 15 at the point of switching 43 (line 41) may have some beneficial effect, the most beneficial effect may be achieved by closing the EGR valve 13 and wastegate 15 prior to the point of switching 43 (line 42).

INDUSTRIAL APPLICABILITY

The present disclosure finds application in the design and operation of internal combustion engines and leads to improvements in the control of air-to-fuel ratios when utilising variable valve actuation systems.

REFERENCE NUMERALS

10 Engine block
11 Cylinder
12 EGR system
13 EGR valve
14 Turbocharger
15 Wastegate
16 Exhaust line
17 Air inlet
18 Inlet manifold
19 Controller
20 Sensor(s)
30 First operating profile
31 Second operating profile
40 Switching from the first to the second operating profile without changing the position of the wastegate 15 or EGR valve 13
41 Switching from the first to the second operating profile and closing the EGR valve 13 and wastegate 15 at the point of switching
42 Switching from the first to the second operating profile and closing the EGR valve 13 and wastegate 15 prior to the point of switching
43 Point of switching
50 Steady state region for first operating profile
51 Steady state region for second operating profile
52 Switching boundary
53 Debounce boundary
54 Debounce boundary
55 Transitional zone boundary
56 Transitional zone boundary

The invention claimed is:

1. A method of operating an internal combustion engine comprising at least one cylinder, the method comprising:

supplying intake gas from an intake manifold to an intake port of a combustion chamber in the cylinder;

selectively operating an intake valve using a first operating profile to open and close the intake port to control flow of the intake gas between the intake manifold and the combustion chamber;

on demand, switching selective operation of the intake valve to a second operating profile in which the closing of the intake valve during an intake stroke of a four stroke engine cycle is delayed compared to the closing of the intake valve using the first operating profile, and the closing of the intake valve using the second operating profile is delayed for a first half of a compression stroke; and wherein prior to the point of switching from the first operating profile to the second operating profile, and within an immediately preceding four stroke engine cycle, a pressure of the intake gas in the intake manifold is increased.

2. The method of claim 1, wherein switching between the first operating profile and the second operating profile is based on at least one engine condition.

3. The method of claim 1, wherein switching between the first operating profile and the second operating profile is instantaneous.

4. The method of claim 1, wherein at least a portion of the intake gas is supplied from a turbocharger or supercharger and the pressure of the intake gas in the intake manifold is increased by selective operation of the turbocharger or supercharger.

5. The method of claim 4 wherein selective operation of the turbocharger includes selectively operating a wastegate to increase the mass flow of exhaust gas through the turbocharger.

6. The method of claim 4 wherein the intake gas comprises a mixture of air and recirculated exhaust gas supplied from an exhaust gas recirculation (EGR) system.

7. The method of claim 6 comprising selectively operating a valve of the EGR system to increase the mass flow of exhaust gas through the turbocharger.

8. The method of claim 7 wherein selectively operating the valve of the EGR system includes closing or partially closing the valve prior to switching from the first operating profile to the second operating profile.

9. An internal combustion engine comprising:

at least one cylinder;

an intake manifold for receiving intake gas;

an intake port communicating between the intake manifold and a combustion chamber of the cylinder;

an intake valve movable to open and close the intake port to control flow of the intake gas between the intake manifold and the combustion chamber;

a turbocharger or supercharger for pressurising at least a portion of the intake gas supplied to the intake manifold; and a controller configured selectively to switch operation of the intake valve for an intake stroke of a four stroke engine cycle between a first operating profile and a second operating profile in which the closing of the intake valve is delayed compared to the closing of the intake valve using the first operating profile, and the closing of the intake valve using the second operating profile is delayed for a first half of a compression stroke;

the controller being further configured to increase the pressure of the intake gas in the intake manifold prior to the point of switching from the first operating profile to the second operating profile, and within an immediately preceding four stroke engine cycle, by directly or indirectly controlling operation of the turbocharger or supercharger.

10. The internal combustion engine of claim 9, further comprising one or more sensors for detecting a load state of the internal combustion engine; the controller being configured to switch between the first operating profile and the second operating profile dependent on output of the one or more sensors.

11. The internal combustion engine of claim 9, wherein the turbocharger comprises a wastegate and the controller is configured to control operation of the turbocharger by at least partially closing the wastegate prior to switching to the second operating profile.

12. The internal combustion engine of claim 9, further comprising an exhaust gas recirculation (EGR) system and wherein the controller is configured to control operation of the turbocharger by at least partially closing a valve of the EGR system prior to switching to the second operating profile.

13. The method of claim 5, wherein the intake gas comprises a mixture of air and recirculated exhaust gas supplied from an exhaust gas recirculation system.

* * * * *